(12) United States Patent
Wedding

(10) Patent No.: US 6,967,988 B1
(45) Date of Patent: Nov. 22, 2005

(54) FILTER FOR DETERMINING CROSS-CORRELATION, RECEIVER, AND METHOD OF EQUALIZING SIGNALS

(75) Inventor: Berthold Wedding, Korntal-Münchingen (DE)

(73) Assignee: Alcatel, Paris (FR)

( * ) Notice: Subject to any disclaimer, the term of this patent is extended or adjusted under 35 U.S.C. 154(b) by 1011 days.

(21) Appl. No.: 09/628,272

(22) Filed: Jul. 28, 2000

(30) Foreign Application Priority Data

Jul. 31, 1999 (DE) ................................. 199 36 254

(51) Int. Cl.⁷ ............................................ H04L 27/30
(52) U.S. Cl. ...................... 375/142; 375/150; 375/232; 708/323
(58) Field of Search ................................. 375/142, 143, 375/150, 152, 343, 232, 233; 378/322, 323; 714/216–218, 714/237, 263

(56) References Cited

U.S. PATENT DOCUMENTS 3,774,019 A * 11/1973 Cook .......................... 708/818
4,267,580 A * 5/1981 Bond et al. .................. 708/818
4,885,715 A * 12/1989 McCanny et al. ............ 708/420
5,283,813 A * 2/1994 Shalvi et al. ................ 375/230

FOREIGN PATENT DOCUMENTS

DE        198 21 142 A1    11/1999

OTHER PUBLICATIONS

H. Bulow, NOC '97, Antwerp 1977, "Equalization of Bit Distortion Induced by Polarization Mode Dispersion", proc. II, pp. 65-72.
J. Proakis, "Digital Communications", third Edition, McGraw-Hill, Inc., pp. 639-640.

* cited by examiner

Primary Examiner—Dac V. Ha
(74) Attorney, Agent, or Firm—Sughrue Mion, PLLC

(57) ABSTRACT

A filter for determining the cross-correlation of optically transmitted signals is disclosed which comprises a ladder structure of amplifier cells 3 and multipliers 4. Such a filter structure is integrated into a receiver for optical signals, the receiver being adaptable to the conditions of the transmission link through a recursive algorithm.

3 Claims, 2 Drawing Sheets

FILTER FOR DETERMINING CROSS-CORRELATION, RECEIVER, AND METHOD OF EQUALIZING SIGNALS

BACKGROUND OF THE INVENTION

This invention relates to a filter for determining cross-correlation, to a receiver with a correlation circuit, and to a method of equalizing signals as set forth in the preambles of the independent claims.

Various receivers for optical signals with input filters and control systems for parameters of the input filters are known in the art. In an article by H. Bülow, NOC '97, Antwerp 1977, "Equalization of Bit Distortion Induced by Polarization Mode Dispersion", various filters, so-called equalizers, are used for conditioning optically transmitted signals.

The as yet unpublished Patent Application DE 198 21 142.2 discloses on optical receiver for the reception of digitally transmitted data. In this receiver, a simple transversal equalizer structure is proposed which works even at very high bit rates. The setting parameters for the transversal filter are generated by evaluating a pseudo-error monitor. The object of the present invention is to provide an optical receiver for high bit rates (40 Gb/s) which contains circuits that are well suited for integration and thus can be manufactured at low cost.

SUMMARY OF THE INVENTION

The filter according to the invention, having the characterizing features of the independent claims, has a very simple structure in order to obtain the data for an input filter via a correlation measurement. The correlation measurement takes place in a ladder structure which represents a transversal traveling-wave filter. The advantages of this structure are the low parasitic capacitances, which result in good adaptability even at very high data rates. The output signals are not combined at a summing point as in conventional structures, where capacitive problems occur at high data rates. With this simple ladder structure, which can also be adopted to the problems of a transmission path because of its simple cascadability, the correlation function of the input signal is determined.

To adapt its input filter, the receiver according to the invention uses parameters which are determined using a cross-correlator. The cross-correlator according to the invention is used in the receiver according to the invention to form a simple recursive structure. By acting on the control parameters of the equalizer through a control unit, a recursive algorithm is started which results in an optimization of the parameters for the equalizer. This convergence criterion, which is introduced from outside, results in a faster or slower adaptation of the adaptive equalizer in the optical receiver.

In a more specific embodiment, a transversal equalizer is advantageously combined with a transversal cross-correlator, and different components are used synergistically. As a result, an extremely simple filter-correlator structure is obtained which makes it possible to construct a large-scale-integrated receiver.

BRIEF DESCRIPTION OF THE DRAWINGS

Embodiments of the invention are depicted in the drawings and are explained in greater detail in the following description. In the drawings.

DETAILED DESCRIPTION OF THE INVENTION

Figure 1:
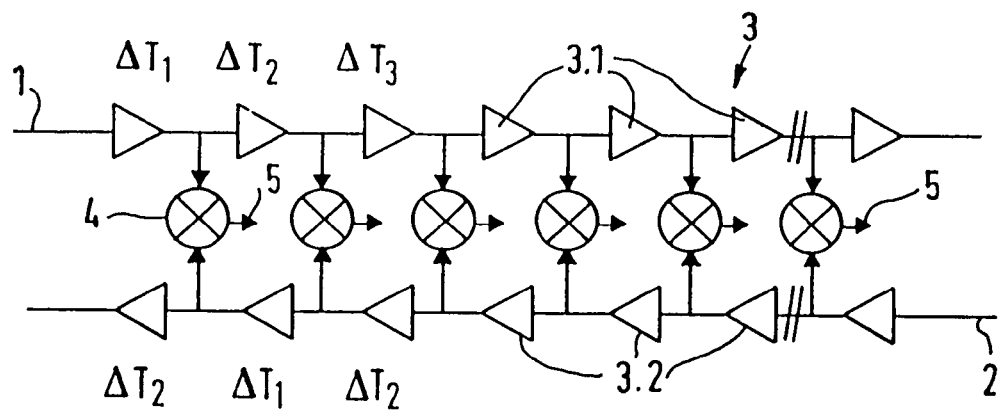
FIG. 1 shows a tranversal cross-correlator.

The correlation measurement according to the invention takes place in a filter structure as shown in FIG. 1. The filter has two inputs 1 and 2. The inputs are each connected to a respective cascade of amplifier cells 3. The two cascades of amplifier cells are connected in opposite directions. In the example of FIG. 1, the signal at input 1 posses through the cascade of amplifier cells 3.1 from left to right, and the signal at input 2 passes through the cascade of amplifier cells 3.2 from right to left. Between each of the individual amplifier cells 3, there is a connection to a multiplier 4. The results of the multiplications appear at the respective outputs 5 of the multipliers. The proposed circuit makes it possible to determine the cross-correlation of two input signals The cross-correlation is defined by $$R_{jh}(t) \equiv \int_{-\infty}^{\infty} f(\tau) h(\tau - t) d\tau$$

If the two signals f(t) and h(t) are identical, this is a case of autocorrelation. To measure this function, as is also described in a publication by A. Poularikas, "The Transforms and Applications Handbook," two signals are applied to inputs 1 and 2. The circuit is composed of two cascades of amplifier cells 3 with unity gain and given delays ΔT. Each multiplier 5 receives two input signals from the two cascades and generates a multiplied signal f(τ)·h(τ−t) for different values of time t. The measurement takes place in increments of ΔT=ΔT$_1$+ΔT$_2$ for adjacent amplifier cells 3. The integration with respect to time is generated through an integrator (not shown in FIG. 1). A low-pass filter, for example, may be used for the output signals 5 of the multipliers 4. The different delays ΔT$_1$+ΔT$_2$ con be realized through different numbers of amplifier cells. In a simple embodiment, the delay ΔT$_1$ con be achieved with one amplifier cell, while the delay ΔT$_2$ requires the use of two amplifier cells. Typically, the delays ΔT are correlated with a clock time T or a fraction thereof.

Figure 2:
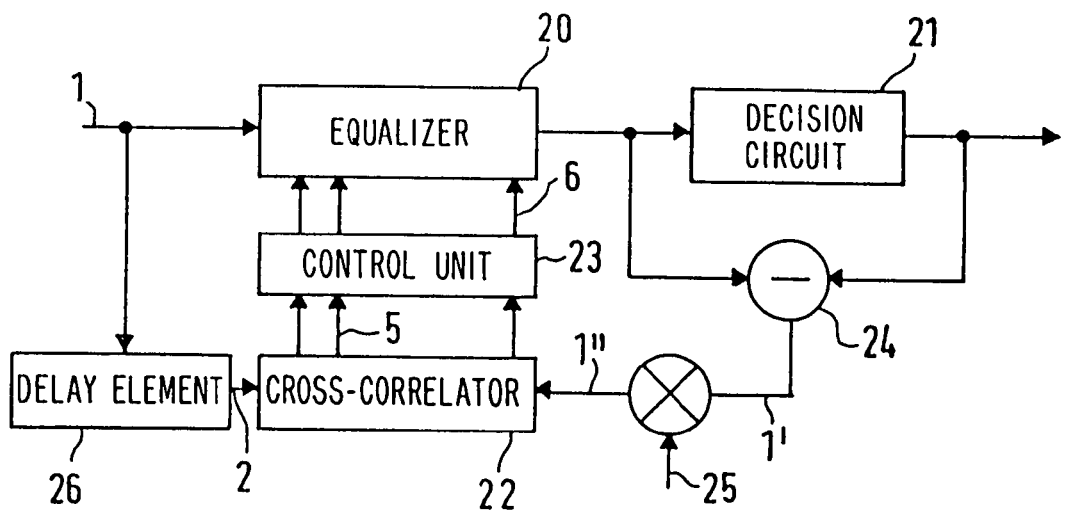
FIG. 2 shows an optical receiver with a recursive structure.

FIG. 2 shows a receiver according to the invention with a recursive structure. An input signal 1 converted from optical to electrical form is presented to this circuit. The signal is applied to the input of an input filter, an equalizer 20. Via a splitter, the signal is applied to a delay element 26, the output signal 2 of which is applied to the input of a cross-correlator 22. The output signal of the input filter 20 posses through a decision circuit 21. The input signal 1 is topped before the decision circuit 21 and after this circuit, and the tapped signals are subtracted from each other in a subtractor 24. As the result of the subtraction, an error signal 1' remains. This signal 1' is fed to a weighting unit 25, in which it may be weighted by applying a factor. The weighted error signal 1" is presented to the second input of the cross-correlator 22. The result of the cross-correlation, 5, forms the input to a control unit 23 which acts on the parameters of input filter 20 through control signals 6. In a simple embodiment, the control unit 23 comprises a series of RC low-pass filters. In another embodiment, the control unit consists of A/D converters, a microprocessor, and D/A converters. With this circuit, a "least mean square" (LMS) algorithm for a recursive adjustment of parameters for input filter 20 is implemented. A circuit for implementing the LMS algorithm is known from a book by J. Proakis, "Digital Communications", page 639, where the principle of the recursive adjustment of filter parameters to the results of an electronic evaluation is presented. The circuit proposed is not suitable for high bit rates, however.

Figure 3:
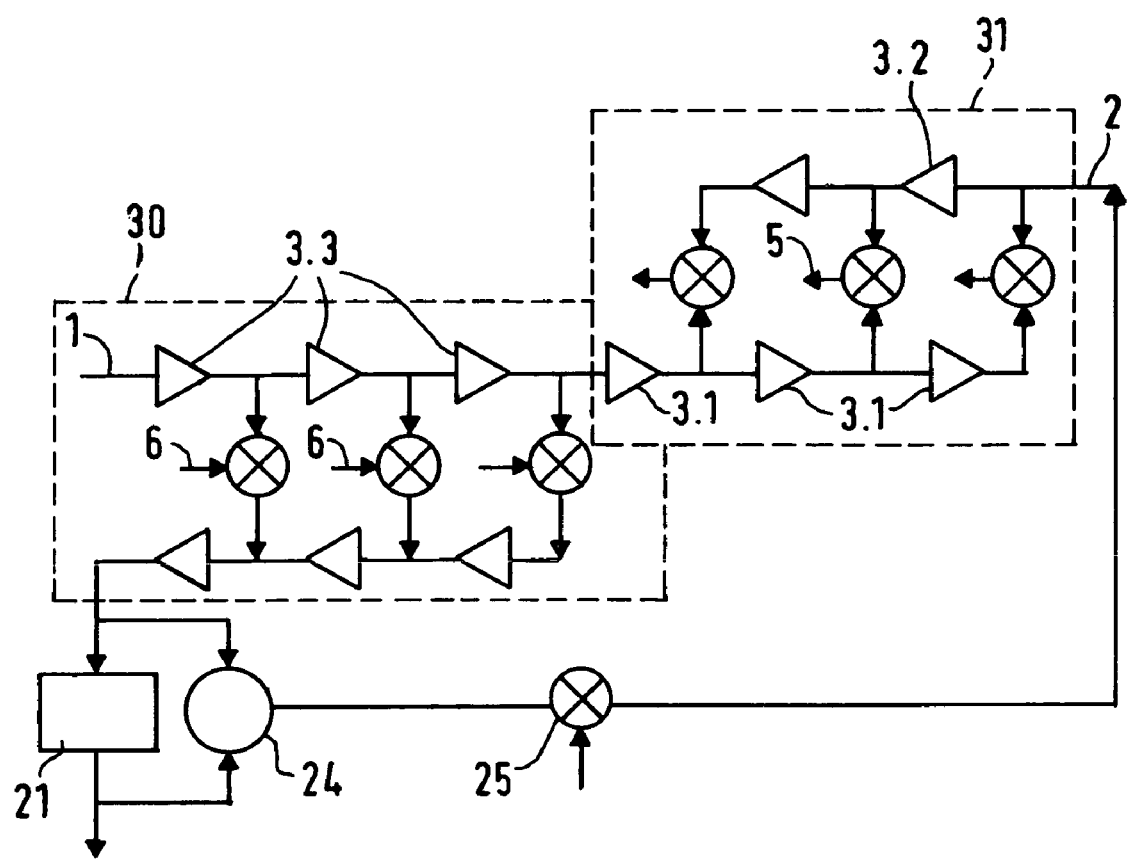
FIG. 3 shows a large-scale-integrated optical receiver with a recursive structure.

A special realization of the proposed receiver is presented in FIG. 3. In this embodiment, the input filter and the cross-correlator are implemented in very-large-scale-integrated (VLSI) form. Input filter 30 has a structure as disclosed in Patent Application DE 198 21 142.2. This transversal filter structure is connected directly to cross-correlator 31. Through continuation of the amplifier cell line of transversal filter 30, the initial amplifier cells 3.3 of transversal filter serve as a delay unit for cross-correlator 31. The result of the cross-correlation, which appears at output 5, is provided through a control unit as a parameter input 6 to the transversal filter. The control unit itself is not shown in this embodiment. The embodiment according to FIG. 3 is an extremely simple, easily integrable structure which permits the manufacture of a low-cost receiver using Si—Ge technology. The circuit makes it possible to process signals in the 10–40 Gb/s range.

Transversal filters cannot only be used to equalize optical signals but also serve to compensate for frequency-dependent attenuations of an electric cable, such as a coaxial cable. The filter coefficients con be preset.

Though the use of a filter with just four filter inputs, it has been possible to positively influence and equalize a 10-Gb/s signal over 10 m of coaxial cable.

What is claimed is:

1. An integrated circuit receiver with a correlation circuit for a continuous input signal having bits, comprising an input filter (20) for receiving the input signal and a correlation of the input signal, a decision circuit (21), a circuit (25) for introducing a convergence criterion and a correlator (22) for measuring the correlation of said input signal by comparison with a delayed said input signal, characterized in that in order to determine the correlation, the correlator comprises a transversal traveling wave filter having two inputs (1,2) and comprising a ladder network composed of integrated amplifier cells (3) and multipliers (4), with the integrated amplifier cells (3.1) of the first input (1) and the inetegrated amplifier cells (3.2) of the second input (2) being connected to the multipliers (4) in opposite directions, and output signals (5) being taken from the mulitipliers.

2. The receiver as claimed in claim 1 constructed as a linear circuit from the transversal filter (30) and the correlator (31), using the amplifier cells (3.3) simultaneously for the transversal filter and the correlator.

3. The receiver as claimed in claim 1, wherein the signal has bit rate in the range of 10–40 Gb/s.

* * * * *